United States Patent [19]
Puri

[11] Patent Number: 5,879,727
[45] Date of Patent: Mar. 9, 1999

[54] INSULATED MODULAR INJECTION NOZZLE SYSTEM

[75] Inventor: Rajan Puri, Mississauga, Canada

[73] Assignee: Husky Injection Molding Systems, Ltd., Canada

[21] Appl. No.: 785,841

[22] Filed: Jan. 21, 1997

[51] Int. Cl.$^6$ .................................................. B29C 45/20
[52] U.S. Cl. ..................................... 425/549; 264/328.15
[58] Field of Search ........................ 425/549; 264/328.15

[56] References Cited

U.S. PATENT DOCUMENTS

| | | | |
|---|---|---|---|
| 4,266,723 | 5/1981 | Osuna-Diaz | 239/132 |
| 5,028,227 | 7/1991 | Gellert et al. | 425/190 |
| 5,046,942 | 9/1991 | Gellert | 425/549 |
| 5,208,052 | 5/1993 | Schmidt et al. | 425/549 |
| 5,299,928 | 4/1994 | Gellert | 425/190 |
| 5,443,381 | 8/1995 | Gellert | 425/549 |
| 5,513,976 | 5/1996 | McGrevy | 425/549 |
| 5,569,475 | 10/1996 | Adas et al. | 425/549 |

OTHER PUBLICATIONS

The Condensed Chemical Dictionary, p. 1116, 1981.
Product Advertisment, KONA, Controlled Vestige (CV) Tips, date unknown.

*Primary Examiner*—Tim Heitbrink
*Attorney, Agent, or Firm*—Fitzpatrick, Cella, Harper & Scinto

[57] ABSTRACT

A modular injection nozzle system for use with hot runner injection machines employs a thermal insulating element between the tip of the injection nozzle and a removable mold gate insert. This thermal insulating element limits the heat loss from the tip to the gate insert, assists in sealing the gate area and provides assistance in aligning the gate and the nozzle during assembly. The removable mold gate insert allows for eased servicing and assembling/dis-assembling of the injection nozzle system and has limited contact with the mold plate. In one embodiment, the removable gate insert is mounted to the nozzle via the insulating member, which is in the form of a sleeve with exterior threads which are complementary to interior threads on the gate insert. The sleeve can either be press-fit onto the nozzle or can have interior threads which are complementary to exterior threads on the nozzle. In either case, the sleeve can assist in the alignment of the components of the nozzle system. In another embodiment, the insulating element also includes an gap between the nozzle tip and the gate insert, the gap having a suitable insulating gas or vacuum therein to provide additional insulation. In another embodiment, the insulating element comprises a layer of insulating material on the nozzle tip and the gate insert can either be press fit with the layer or the layer can have exterior threads can into it to engage complementary threads on the gate insert. In another embodiment, the insulating element is molded in place on the nozzle tip.

39 Claims, 8 Drawing Sheets

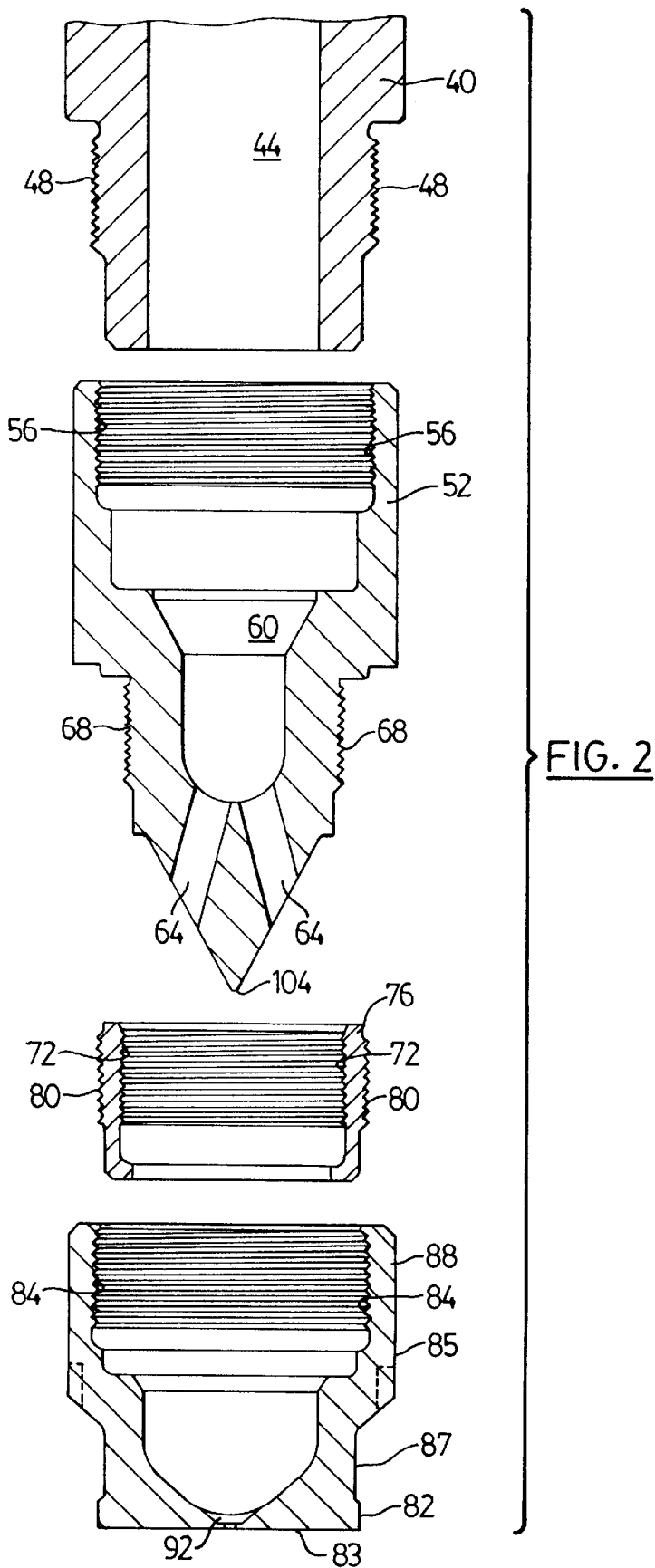

INSULATED MODULAR INJECTION NOZZLE SYSTEM

FIELD OF THE INVENTION

The present invention relates to an injection nozzle system. More particularly, the present invention relates to an injection nozzle system comprising modular components, one of which comprises a mold gate insert removably attached to a nozzle tip by a thermal insulating element therebetween, the injection nozzle system being particularly suited for molding relatively large products.

BACKGROUND OF THE INVENTION

Injection nozzle systems for hot runner injection systems are well known and include systems such as the SDVG 750 single drop valve gate, SDHT 750 single drop hot sprue and ULTRA systems sold by the assignee of the present invention. Such injection nozzle systems are constructed to very close tolerances to accommodate the high pressures typically employed in hot runner injection molding and to provide the necessary degree of process control to reduce visible gate vestiges on the molded items, etc.

In particular, avoiding the formation of visible gate vestiges is very much desired within the industry. As is known to those of skill in the art, the formation of visible gate vestiges is mitigated by good process control, the high tolerances used in the construction of the nozzle system and by good thermal properties in the nozzle. In particular, to obtain acceptable thermal properties, it is desired that the heater elements in the nozzle system be located as closely as possible to the nozzle tip to ensure rapid and efficient heating of resin in the gate area. Of course, the mold plates must also be able to provide sufficient cooling to the gate to freeze the resin when the injection portion of the molding cycle is complete.

Reference is made in this regard to U.S. Pat. No. 5,046, 942 to Gellert which teaches a thermal-gated nozzle wherein a second heating element is located adjacent the mold gate area and embedded inside a two part nozzle tip to provide the desired heating of the nozzle tip.

One problem which occurs with some prior nozzle systems, such as that taught in Gellert, is that a mechanical contact is present between the nozzle tip and the mold gate area that allows thermal transfer to occur between these two members. Accordingly, undesirable cooling of the nozzle tip occurs, as does undesirable heating of the gate by the heater elements on the nozzle and/or nozzle tip.

Attempts have been made in the past to mitigate these problems by providing insulation between the gate and the nozzle. For example, U.S. Pat. No. 5,208,052 to Schmidt et al., assigned to the assignee of the present invention, teaches an injection nozzle with a removable nozzle tip made of material with a relatively high thermal conductivity which is surrounded by a removable thermal insulation sleeve made of material with a lower thermal conductivity, which also acts as a seal to intrusion of resin into unwanted regions of the nozzle system. A similar concept is also described in U.S. Pat. No. 5,299,928 to Gellert, wherein the insulation sleeve is placed between the nozzle tip and the housing of the injection nozzle. More recently, U.S. Pat. No. 5,569,475 to Adas et al. discloses several types of insulation coating layers that are used in hot runner systems adjacent the mold gate area.

However, each of these prior systems, and all others of which the present inventor is aware, suffer from one or more disadvantages and/or drawbacks. For example, the approach shown in Adas has very limited application since the insulation layers taught are very thin and provide little impediment to unwanted heat transfer. Also the layers taught in Adas are not very strong mechanically and are thus susceptible to mechanical failure. While the insulation sleeve disclosed by Schmidt in U.S. Pat. No. 5,208,052 and the similar sleeve disclosed by Gellert in U.S. Pat. No. 5,299, 928 are reasonable insulators and are reasonably robust mechanically, these nozzle systems are generally not satisfactory for molding articles from abrasive resins, such as the so-called engineering grade resins of which NORYL GTX is an example, as such resins damage the mold gate through abrasive wear requiring replacement of the entire mold plate in which the mold gate is formed. Further, these nozzle systems are generally not generally satisfactory for molding articles from heatsensitive materials, such as crystalline resins of which PA 66 is an example, as such materials require more heat at the gate area than other resins. As the mold gate is embedded in the mold plate in these prior systems and is thus subject to heat loss to the mold plate which is cooled by the mold cooling system, poor thermal performance is obtained and the required heat at the gate cannot reliably be obtained.

It is desired to have a injection nozzle system with good thermal properties and which provides enhanced serviceability and relatively easy assembly and disassembly.

SUMMARY OF THE INVENTION

It is an object of the present invention to provide a novel insulated modular injection nozzle system with a removable mold gate which obviates or mitigates at one of the disadvantages of the prior art nozzle systems.

According to a first aspect of the present invention, there is provided an insulated modular injection nozzle system for use in conjunction with an injection molding machine, comprising:

a mold gate insert having a mold gate therein;

a nozzle assembly comprising a thermally conductive nozzle housing and a thermally conductive nozzle tip, said nozzle assembly defining at least one inner melt channel to receive molten resin from a mold machine and to direct said molten resin to said mold gate;

at least one heater element in thermal contact with said nozzle assembly and operable to maintain said resin in a molten state through said at least one inner melt channel; and an insulating element connecting said mold gate insert to said nozzle housing such that said nozzle tip is maintained adjacent said mold gate and inhibiting thermal transfer therebetween.

Preferably, the mold gate insert includes an abutment portion which contacts a mold plate and which is sized to reduce heat transfer between the mold plate and the mold gate insert. Also preferably, in addition to improving thermal properties of the nozzle system, the thermal insulating member also assists in sealing off the gate area. Also preferably, the insulating element assists in the alignment of the mold gate insert relative to the nozzle tip. Also preferably, the gate is formed in a gate ring which is removably mounted in the mold gate insert.

BRIEF DESCRIPTION OF THE DRAWINGS

Preferred embodiments of the present invention will now be described, by way of example only, with reference to the attached Figures, wherein:

FIG. 2 shows an exploded cross section of some of the components of FIG. 1;

DETAILED DESCRIPTION OF THE INVENTION

Figure 1:
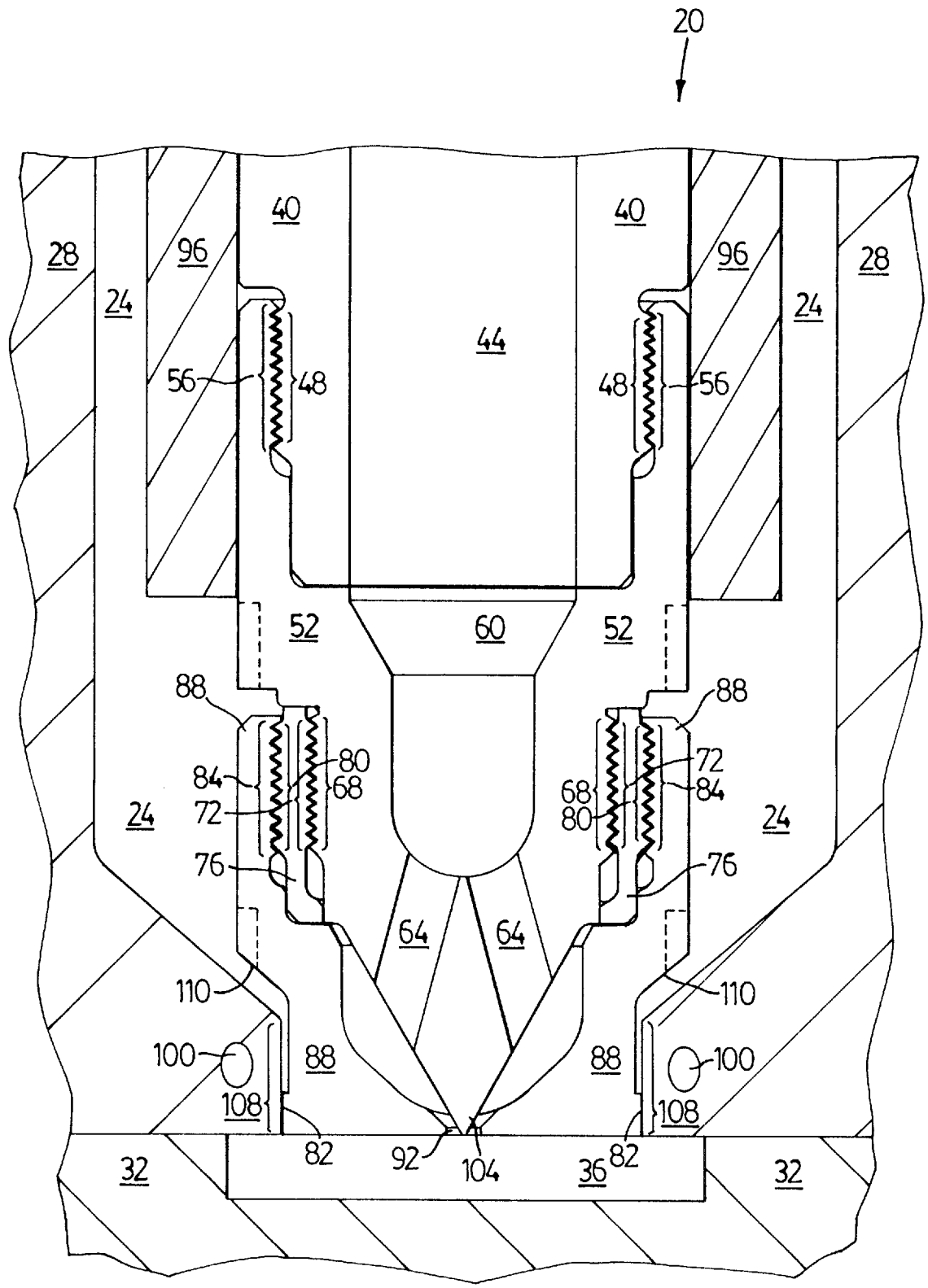
FIG. 1 shows a cross section through an insulated modular injection nozzle system for hot runner injection molding machines in accordance with an embodiment of the present invention.

In FIG. 1, an insulated modular injection nozzle system in accordance with a first embodiment of the present invention is indicated generally at 20. Nozzle system 20 is hot runner injection nozzle system which is located in a mold bore 24 in an injection mold comprising a stationary mold plate 28, which is connected to the injection unit of a molding machine (not shown), and a movable mold plate 32. A cavity mold 36 is formed between stationary mold plate 28 and moveable mold plate 32 when the mold is in the closed position, as shown in the Figure.

FIG. 2 shows an exploded view of some of the components of nozzle system 20. As can be seen, nozzle system 20 includes an elongated nozzle housing 40 which is preferably made of material with a relative high thermal conductivity and which defines an inner main melt channel 44 through which pressurized molten resin can pass. Nozzle housing 40 includes a connecting portion 48, which in this embodiment is an external set of threads although it is contemplated that other suitable connecting portion configurations can be employed, if desired.

Nozzle system 20 further includes a removable nozzle tip 52 which includes a first connecting portion 56 to connect to and engage with connecting portion 48 of nozzle housing 40 to form a nozzle assembly. As mentioned above, in this embodiment connecting portion 48 comprises a set of external threads and connecting portion 56 comprises a set of complementary internal threads which allow nozzle tip 52 to be screwed into engagement with nozzle housing 40. While it is presently preferred that nozzle tip 52 be removably connected to nozzle housing 40, the present invention can also be employed in systems wherein nozzle tip 52 and nozzle housing 40 are a single element, either an permanent assembly which can not be disassembled or a single integral element, and such configurations are intended to fall within the scope of the present invention.

Nozzle tip 52 includes a central melt channel 60 which is coaxial with melt channel 44. Nozzle tip 52 is also preferably made of a material with a relatively high thermal conductivity, such as copper-based alloys produced, for example, by Ampco.

As will be apparent to those of skill in the art, in the embodiment of FIGS. 1 and 2, nozzle tip 52 is of a type commonly referred to as a divert type and thus comprises at least two angled inner secondary melt channels 64. However, as will also be apparent to those of skill in the art, the present invention is not limited to use with divert type nozzle tips and many other nozzle tip types, including univerted, thru-flow, triverted, edge-gating and valve gate tips, amongst others, can be successfully employed with the present invention.

Nozzle tip 52 further includes a second connecting portion 68 which cooperates with a first connecting portion 72 of an insulating element 76. In this embodiment, second connecting portion 68 comprises a set of external threads which engage a complementary set of internal threads comprising first connecting portion 72 of insulating element 76.

In this embodiment of the present invention, insulating element 76 is in the form of a sleeve fabricated from a suitable insulating material which has a relatively low thermal conductivity. The selection of a suitable insulating material for insulation element 76 is not particularly limited and a variety of several suitable insulating materials will occur to those of skill in the art, examples of which include Titanium and various ceramics.

First connecting portion 72 of insulating element 76 comprises a set of internal threads which are complementary to the external threads of second connecting portion 68. Insulating element 76 also includes a second connecting portion 80 to connect insulating element 76 to a connecting portion 84 of a removable gate insert 88.

Gate insert 88 includes a mold gate 92 and, as will be apparent, is fabricated from a suitable known material such as well known tooling metals like H-13, P 20 etc. Again, in this embodiment second connecting portion 80 of insulating element 76 comprises a set of external threads and connecting portion 84 of gate insert 88 comprises a set of internal threads complementary thereto. The actual geometry and size of mold gate 92 depends upon the particular configuration and size of nozzle tip 52. Mold bore 24 terminates with a gate bore 108 that is used to locate and align gate insert 88 with respect to nozzle tip 52. In this particular embodiment, gate insert 88 has an outer portion 110 that is larger in diameter than gate bore 108.

As can be seen in FIG. 2, gate insert 88 includes an abutment surface 82 adjacent it lower surface 83 which is of a larger diameter than its throat 87. Thus, as shown in FIG. 1, contact between gate insert 88 and mold plate 28 occurs only at abutment surface 82. As will be apparent to those of skill in the art, by limiting the amount of contact between gate insert 88 and mold plate 28 and by positioning that limited contact at lower surface 83 adjacent the location of gate 92, the thermal properties of nozzle system 20 are enhanced as the bulk 85 of gate insert 88 is not in direct thermal contact with mold plate 28 and thus gate 92 can be heated and cooled, as required.

It is contemplated that there are several advantages provided by the use of removable gate insert 88. In particular, use of gate insert 88 avoids the need to machine the mold gate 92 as part of the mold plate 28. This can result in a significant reduction in manufacturing costs and an increase in the accuracy of the machining of gate 92. Also, gate insert 88 can be made of different materials than mold plate 28, such as known suitable materials such as tooling metals H-13, 4140 or P 20 and/or materials with a relatively high wear resistance for use with abrasive resins. As replacement of gate 92 merely requires the replacement of gate insert 88, it is also contemplated that maintenance costs will generally be reduced.

Figure 3A:
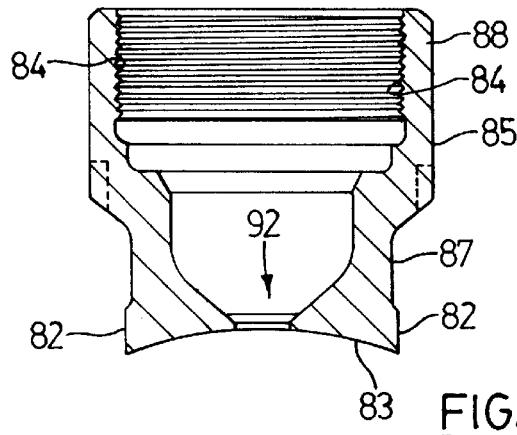
FIGS. 3a, 3b and 3c show cross sections of gate inserts for use with a nozzle system in accordance with the present invention.
Figure 3B:
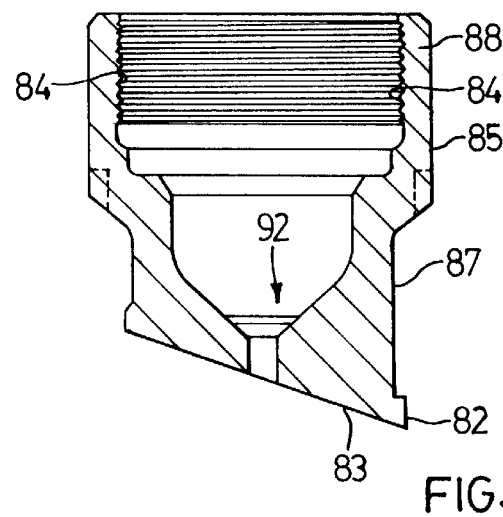

Further, in some circumstances wherein the cavity mold does not have a flat surface, gate insert 88 can be manufactured with lower surface 83 having a desired geometry, such as a concave shape, as shown in FIG. 3a, or an inclined surface, such as shown in FIG. 3b. The present invention is not limited to such geometries and other possible geometries will be apparent to those of skill in the art. Clearly, in many circumstance machining of gate insert 88 to obtain a required mold geometry is simpler and less expensive than machining mold plate 28 to achieve that geometry.

Figure 3C:
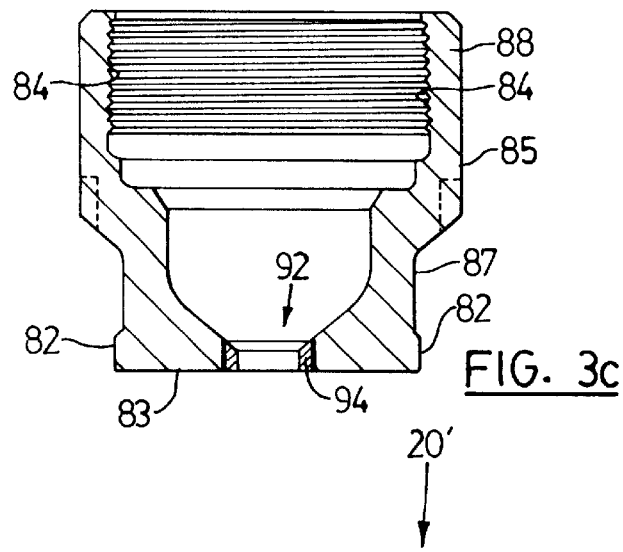

While mold gate 92 can be directly machined into gate insert 88, as shown in FIGS. 1 and 2, gate 92 can be machined in a separate, removable gate ring 94 as shown in FIG. 3c. In this alternative, gate ring 94 is mounted in gate insert 88 via an interference fit, with a lower shoulder (not shown) adjacent lower surface 83 to prevent gate ring 94 from being expressed from gate insert 88, or by threads or other suitable mounting means as will occur to those of skill in the art and the use of such a removable gate ring 94 allows further customization of gate material and/or geometry as desired. In addition, replacement of gate 92 merely requires the replacement of gate ring 94, thus further reducing maintenance costs. This also allows, in the event that conventional hot runner valve gate configurations (not shown) are used, fabrication of gate ring 94 from a wear resistant material that is compatible with the material of the valve gate stem.

In any case, gate insert 88 results in a nozzle system 20 wherein it is easier to clean gate 92 to remove burned resins or other contaminants, to clean the nozzle when resin changes are performed (such as from a first color resin to a second color resin) and to change gate 92 if a different type of nozzle, resin or mold is to be used with nozzle system 20.

Referring again to FIGS. 1 and 2, at least one heater element 96 (shown in FIG. 1) is located in thermal contact with nozzle housing 40 and nozzle tip 52, preferably as close to gate 92 as possible. Heater element 96 can be any suitable heater, such as that described in U.S. Pat. No. 5,411,392 to Von Buren and assigned to the assignee of the present invention.

In use, pressurized molten plastic resin is injected by nozzle system 20 into cavity mold 36 through mold gate 92 and the pressurized molten plastic resin is maintained in its molten state by heater element 96. After the cavity mold 36 has been filled with plastic resin, via melt channel 44, melt channel 60, secondary melt channels 64 and mold gate 92, the injection is topped and a mold cooling system is activated. Common mold cooling systems comprise a cooling fluid which is circulated through cooling passages 100 in mold plate 28 when the cooling system is activated and this cooling solidifies the resin in mold gate 92, commonly referred to as 'freezing' the gate, thus permitting the opening of cavity mold 36 for ejection of a solid and cooled molded part (not shown).

On the next injection cycle, after cavity mold 36 has been closed, the mold cooling system is deactivated and the resin in mold gate 92 is again converted to the molten state by the heat transferred from heater element 96 via nozzle tip 52 and injection of molten resin is recommenced.

As mentioned above, it is desirable to place heater element 96 as close as possible to the end portion 104 of the nozzle tip 52 and thus as close as possible to mold gate 92 to control the melt flow and to thus maintain the size of the residual gate vestige on the molded article at a minimum. As also mentioned above, after the injection of resin is stopped, mold gate 92 must be efficiently cooled by the cooling system to freeze the mold gate and thus inhibit leaking of the resin through the mold gate 92 and into mold cavity 36. These contradictory requirements for large and rapid heating and cooling capacities are difficult to achieve, especially within the tight confines of the area about gate 92 and end portion 104. To mitigate this difficulty, insulating member 76 is employed as shown in FIGS. 1 and 2 to provide a degree of thermal isolation between gate insert 88 (and thus gate 92) and nozzle tip 52 and nozzle housing 40.

In addition to improving the thermal properties of nozzle system 20, insulating element 76 provides additional advantages in that it is useful as a locator to assist in the alignment of nozzle tip 52 relative to gate 92, and thus to cavity mold 36, by providing a mechanical connection between nozzle tip 52 and gate insert 88. Further, insulating element 76 acts as a seal to inhibit leakage of pressurized plastic resin into areas within mold bore 24 or gate bore 108.

As will be apparent to those of skill in the art, the modular design of nozzle system 20 provides significant advantages over integrally manufactured nozzles and gates, including eased servicing and/or simplified production run changes. In particular, while mold gate inserts are known in the injection molding industry, unlike the prior gate inserts of which the present inventor is aware and which are non-removable together with the nozzle housing and/or tip once installed in the mold plate, in the presently preferred embodiments of the invention the mold gate insert is removable with the nozzle and, it is believed that such an insert, in combination with the provision of insulating element 76, results in a particularly advantageous nozzle system.

While the provision of thermal insulation has been disclosed in the U.S. Pat. No. 5,208,052 of Schmidt et al., assigned to the assignee of the present invention, the Schmidt system and the other prior systems of which the present inventor is aware are not modular systems and do not employ gate inserts. Thus, these prior systems are difficult to service and expensive to manufacture. Perhaps more significantly, the non-modular mold gates in the prior art are embedded in the mold plates, resulting is significant thermal transfer from the gate to the mold plate and resulting in generally poor thermal properties for the nozzle system. In contrast, in present invention contact between gate insert 88 and mold plate 28 is limited to abutment surface 82, allowing gate insert 88, and thus gate 92, to be maintained at a higher temperature.

As will be apparent from the description above, nozzle system 20 has a modular construction which can comprise standardized components which have been optimized in terms of materials and/or geometries enabling high quality injection operations to be achieved and yet which can be assembled and serviced with greater simplicity than the prior nozzle systems of which the present inventor is aware. Further, the use of standardized components allows the replacement or exchange of individual components, rather than requiring the replacement of the complete nozzle system as was often the case with the prior systems.

Figure 4:
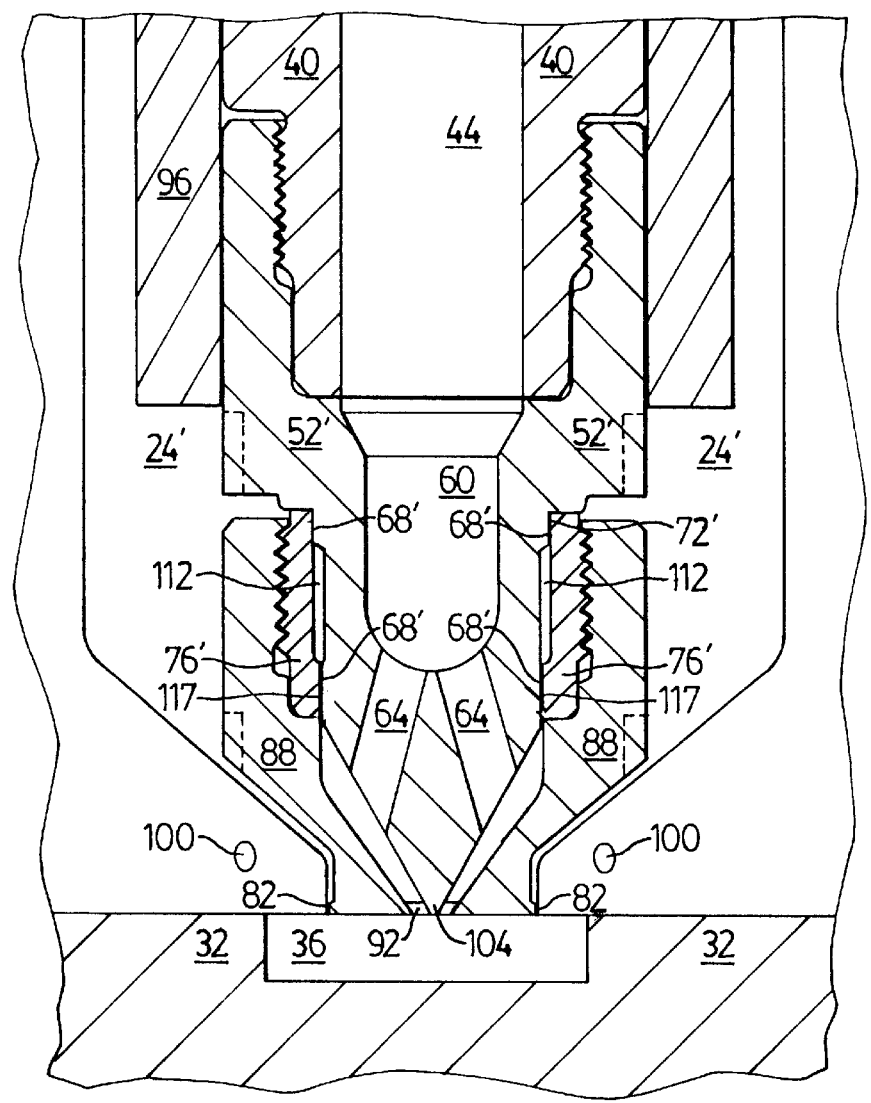
FIG. 4 shows a cross section through an insulated modular injection nozzle system for hot runner injection molding machines in accordance with another embodiment of the present invention.

FIG. 4 shows another embodiment of a nozzle system 20' in accordance with the present invention and wherein like components to those of the embodiment of FIGS. 1 and 2 are identified with like reference numerals and components which differ are identified by reference numerals with a prime (') appended. In this embodiment, the thermal insulation properties of insulating element 76' are further enhanced by providing a gap 112 between the inner circumference of insulating element 76' and nozzle tip 52'.

Figure 5:
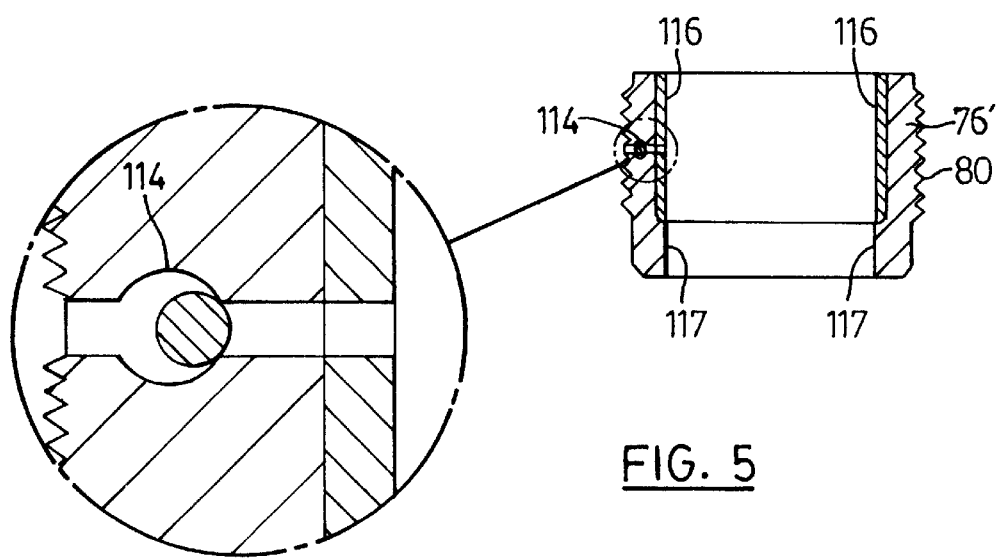
FIG. 5 shows a cross section of an insulating element in accordance with an embodiment of the present invention.

While in many circumstances gap 112 will be air filled, it is contemplated that other gases with a lower thermal conductivity may be employed within gap 112 or, for even better insulating ability, a vacuum may be employed within gap 112, if desired. If other gases or a vacuum are employed, a suitable check valve, such as miniature ball check valve 114 shown in FIG. 5, or other suitable means of admitting the gas to or creating a vacuum in gap 112 will be provided, as will be apparent to those of skill in the art. In the event that a vacuum is employed in gap 112, an additional improvement in the insulating capabilities of insulating element 76' can be obtained by coating the inner surface of insulating element 76' with a layer of reflective material 116, such as silver or chromium, to reduce heat transfer by radiation.

When gap 112 is provided, second connecting portion 68' of nozzle 52' and first connecting portion 72' are not threaded and insulating element 76' instead includes an inner shoulder portion 117 at its lower end which sealingly engages the lower part of connecting portion 68' and the upper part of connecting portion 68' sealingly engages the upper edge of first connecting portion 72' of insulation element 76' by press fitting. It is contemplated that insulating element 76' may be retained in place via brazing of the upper edge of insulating element 76' to second connecting portion 68' or by complementary threads on the upper and lower parts of connecting portion 68' and 72' or any other suitable retaining technique, as will occur to those of skill in the art. Also, a suitable sealant may be employed in assembling insulating element 76' to nozzle tip 52' if desired.

As with the embodiment discussed above with respect to FIGS. 1 and 2, second connecting portion 80 of insulating element 76' still engages first connecting portion of gate insert 88, preferably via complementary threads as shown.

If it contemplated that, depending upon the dimensions of nozzle system 20' and the material from which insulating member 76' is fabricated, the clearance between the inner surface of insulating element 76' and the outer surface of nozzle tip 52' (i.e.—the thickness of gap 112) can preferably range from about 0.1 mm to about 10 mm.

Figure 6:
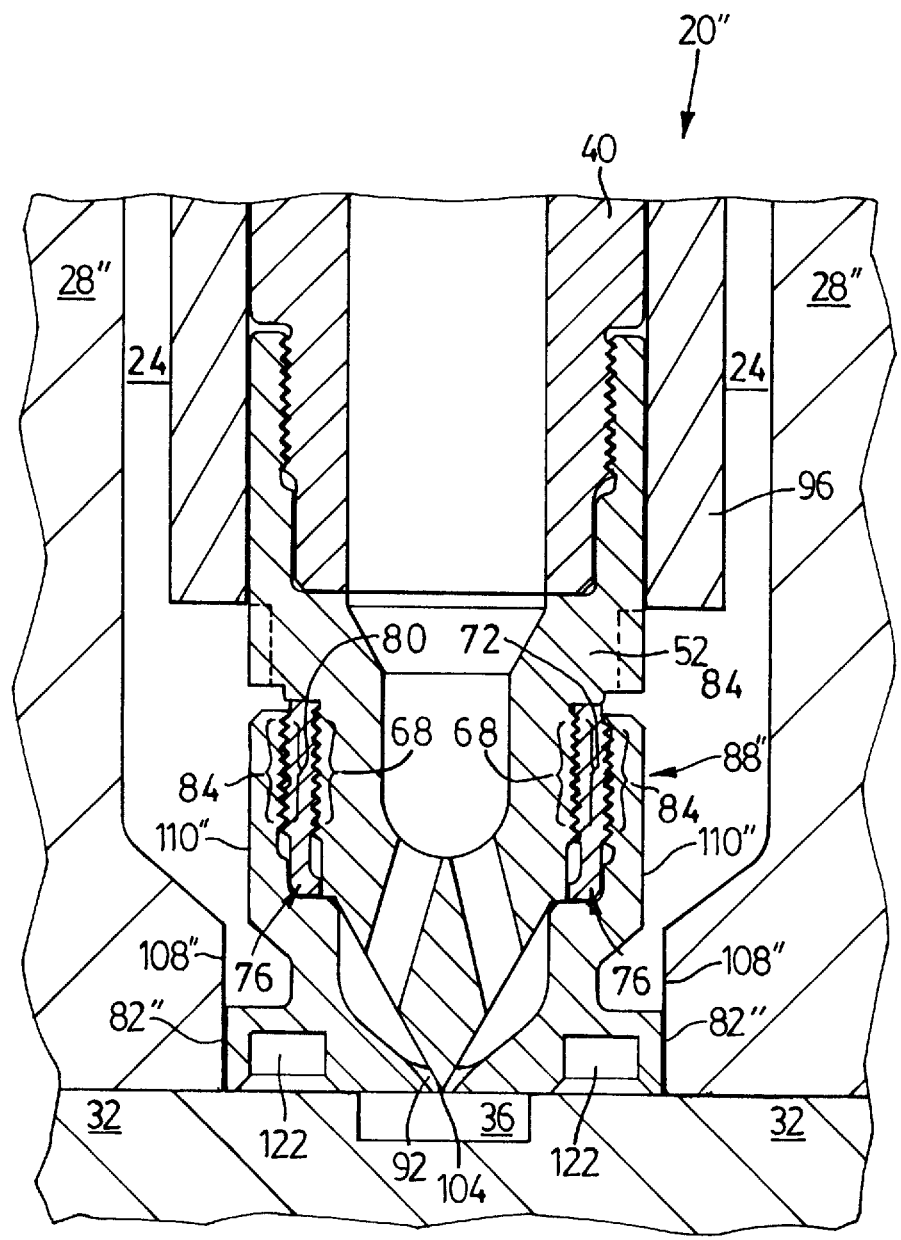
FIG. 6 shows a cross section through an insulated modular injection nozzle system for hot runner injection molding machines in accordance with another embodiment of the present invention.

FIG. 6 shows another embodiment of a nozzle system 20" in accordance with the present invention and wherein like components to those of the embodiment of FIGS. 1 and 2 are identified with like reference numerals and components which differ are identified by reference numerals with two primes (") appended. In this embodiment, gate insert 88" can be removed from the molding area side of mold plate 28", without the need to remove the balance of nozzle system 20" from mold plate 28". Specifically, mold gate bore 108" has a slightly larger diameter than outer portion 110" to allow the removal of gate insert 88" from the molding area without dis-assembling the nozzle system 20". Gate insert 88" is maintained in connection with nozzle tip 52 via the connections between second connection portion 68 and first connection portion 72 and between second connection portion 80 and first connection portion 82.

A suitable tool (not shown) can be employed to engage tool receptacles 122 to rotate gate insert 88" and disengage gate insert 88" from nozzle tip 52, allowing gate insert 88" to be removed from mold bore 24 via gate bore 108". If desired, once gate insert 88" has been removed, insulating element 76 and/or nozzle tip 52 can also be removed via gate bore 108" for servicing, replacement or to allow for changes in production requirements and/or processes. In this embodiment in particular, it is also contemplated that insulating element 76 will favorably act to assist in the alignment of gate 92 with end portion 104 of nozzle tip 52. Further, heater element 96 can be removed via gate bore 108" in this embodiment, should it fail or otherwise require replacement. It should be noted that in FIG. 6, the relative dimensions of abutment portion 82' and gate bore 108" have been somewhat exaggerated for clarity and can be of different relative dimensions.

Figure 6A:
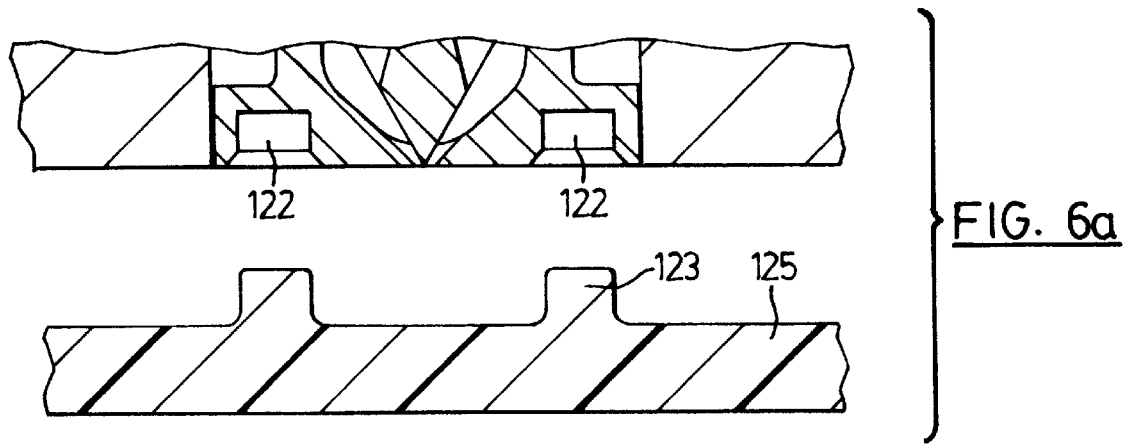
FIG. 6a shows a cross section of the nozzle system of FIG. 6 and a part molded therewith.
Figure 6B:
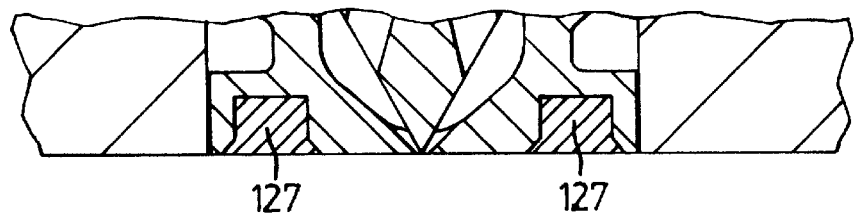
FIG. 6b shows a cross section of the nozzle system of FIG. 6 with plugs installed therein.
Figure 6C:
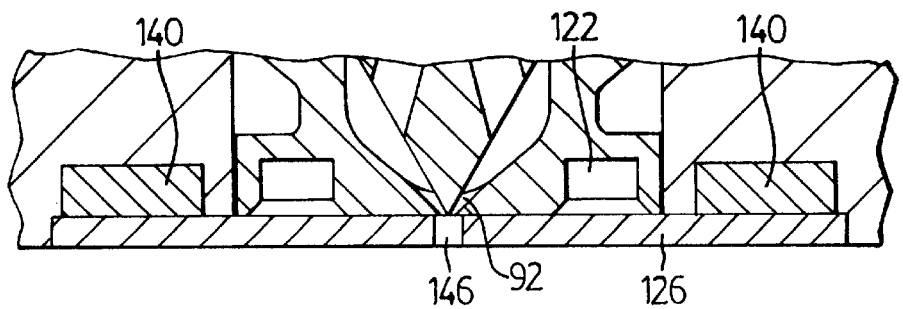
FIG. 6c shows a cross section of the nozzle system of FIG. 6 with a cover plate installed therein.

In order to install and remove gate insert 88" from mold plate 28" it is contemplated that two or more tool receptacles 122 will be provided in the outer surface of gate insert 88". In the event that tool receptacles 122 are located inside of cavity mold 36, as shown in FIG. 6a, some residual plastic sprues 123 may resulted on the molded articles 125. Should such sprues be unacceptable, a suitable plug 127 may be employed in receptacles 122 to inhibit such sprues from being formed, as shown in FIG. 6b. In other circumstances, such as that shown in the FIG. 6c, a cover plate 126 can be employed to cover receptacles 122 and form the surface of mold cavity 36. Plate 126 can be maintained in place by magnets 140, or any other suitable means as will occur to those of skill in the art, and a bore 146 will be provided to allow entry of molten resin into cavity mold 36 from gate 92 resin receptacles 122 will be located outside mold cavity 36.

The simple removal and installation of gate insert 88" from the molding area side of mold plate 28" which is provided by this embodiment has several advantages, including simplified maintenance and servicing of nozzle system 20" without requiring removal of mold plate 28 from the machine. In particular, in molding applications requiring color changes removal of gate insert 88" from the mold side of mold plate 28" allows for the simple removal of the bubble of previous color resin which remains in the area in gate insert 88" between nozzle tip 52 and gate 92. Further, this also allows easy changes of gate 92 to accommodate changes in resin parameters during production. Also, if gate insert 88" has a gate 92 provided by a gate ring 94, repair or replacement of gate 92 can be accomplished with minimal effort and expense.

Figure 7:
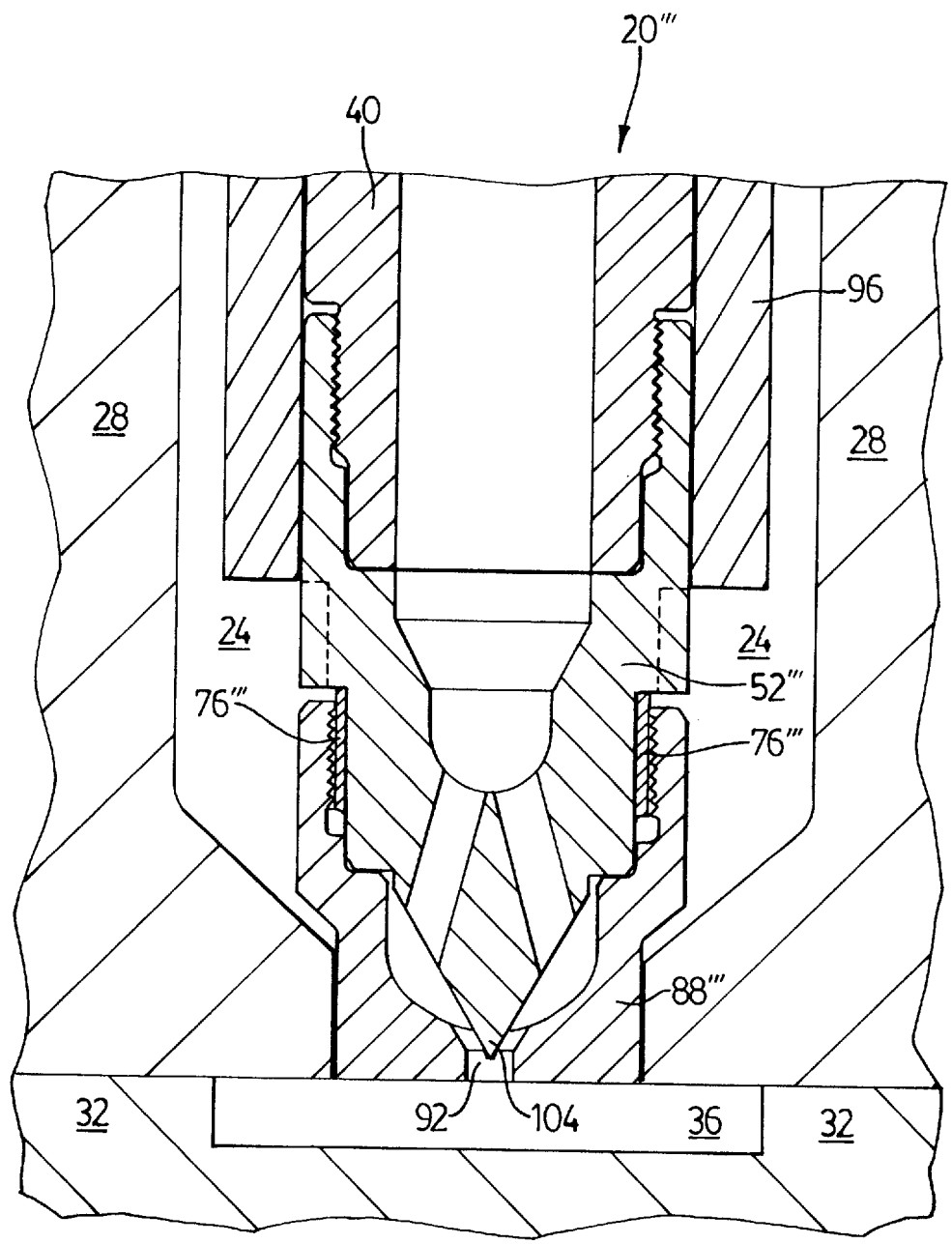
FIG. 7 shows a cross section through an insulated modular injection nozzle system for hot runner injection molding machines in accordance with another embodiment of the present invention.

FIG. 7 shows a nozzle system 20''' in accordance with the present invention and wherein like components to those of the embodiment of FIGS. 1 and 2 are identified with like reference numerals and components which differ are identified by reference numerals with three primes ('") appended. In this embodiment, insulating element 76''' comprises a layer of suitable insulating material, such as zirconia oxide, which is applied to nozzle tip 52''' as shown. Depending upon the insulating material employed, this layer can be sprayed, chemically deposited, sputtered or otherwise applied to nozzle tip 52''' where it would otherwise directly contact gate insert 88. Again depending upon the insulating material employed, the connection of nozzle 52''' to gate insert 88 through second connecting portion 68 of nozzle 52''' and connecting portion 84 can be accomplished via complementary threads, by press fitting or any other suitable means of maintaining this connection as will occur to those of skill in the art.

It is contemplated that the layer of insulating material on nozzle 52''' can be re-applied, from time to time, if necessary. It is also contemplated that insulating element 76''' can comprise the combination of a sleeve, such as that shown in FIGS. 1 and 2, and a layer of insulating material such as that shown in FIG. 7.

Figure 8:
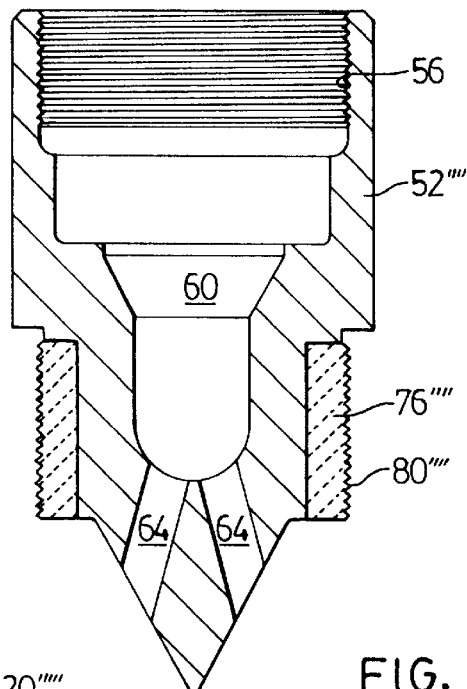
FIG. 8 shows a nozzle tip with a molded insulating element in accordance with another embodiment of the present invention.

FIG. 8 shows a nozzle tip 52'''' in accordance with the present invention and wherein like components to those of the embodiment of FIGS. 1 and 2 are identified with like reference numerals and components which differ are identified by reference numerals with four primes ('''') appended. In this embodiment, insulating element 76'''' has been molded in place on nozzle tip 52''''. Specifically, nozzle tip 52'''' is placed into a suitable mold, as an insert, and a suitable moldable composition is injected into the mold about the outer surface of the relevant portion of nozzle tip 52'''' to form insulating element 76''''. Insulating element 76'''' can be molded with a set of external threads 80'''', if desired, to engage the corresponding connection portion of gate insert 88.

An example of a suitable moldable composition is "sialon" (Si—Al—O—N) and at least one additional element selected from the group comprising Ce, La, Dy, Hf and Zr. This ceramic material has the desired high strength and low thermal conductivity and is described in "Microstructure and Mechanical Properties of F'Si$_3$Al$_3$O$_3$N$_5$ Ceramics", Kokmeijer et al., Journal of European Ceramic Society, vol. 8, no. 2, 1991, pp. 71–80, the contents of which reference are incorporated herein by reference.

It is contemplated that the embodiment of FIG. 8 will be particularly desirable for systems which require high cavitation, i.e.—several injection nozzles per cavity mold, due to the economical manufacturing costs of nozzle tip 52''''.

Figure 9:
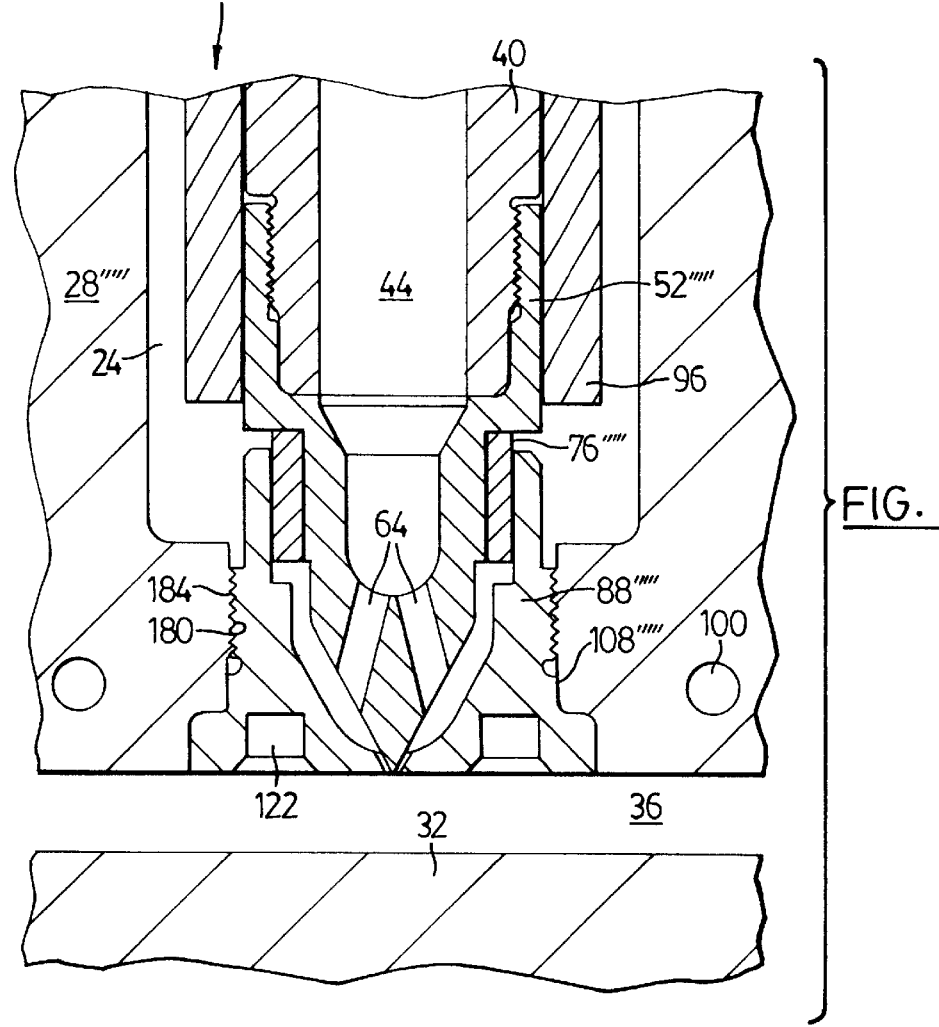
FIG. 9 shows a cross section through an insulated modular injection nozzle system for hot runner injection molding machines in accordance with another embodiment of the present invention.

FIG. 9 shows another embodiment of a nozzle system 20''''' in accordance with the present invention and wherein like components to those of the embodiment of FIGS. 1 and 2 are identified with like reference numerals and components which differ are identified by reference numerals with five primes (''''') appended. In this embodiment, gate insert 88''''' includes a set of external threads 180 which are complementary to and engage with a set of internal threads 184 in gate bore 108'''''. Insulating element 76''''' is press fit onto nozzle tip 52''''' and thus nozzle housing 40 and nozzle tip 52''''' can be removed from nozzle bore 24 with or without removing gate insert 88''''', as desired. Further, gate insert 88''''' can be removed and/or replaced independent of nozzle tip 52''''', by unscrewing gate insert 88''''' from mold plate 28''''' with a tool that engages tool receptacles 122 or in any other suitable manner.

The present invention provides a novel injection nozzle system with improved thermal properties by employing an insulating element and a removable gate insert. In addition, the modularity of the system can result in simplified assembly and servicing of the system and lower manufacturing costs.

The above-described embodiments of the invention are intended to be examples of the present invention and alterations and modifications may be effected thereto, by those of skill in the art, without departing from the scope of the invention which is defined solely by the claims appended hereto.

We claim:

1. An insulated modular injection nozzle system for use in conjunction with an injection molding machine having a mold cavity and a mold plate, comprising:

a removable mold gate insert having a mold gate therein, said mold gate insert being removably coupled to an insulating element, said mold gate insert being removable from said mold plate in an axial direction of said insert;

said nozzle assembly comprising a thermally conductive nozzle housing and a thermally conductive nozzle tip, said nozzle assembly defining at least one inner melt channel to receive molten resin and to direct said molten resin to said mold gate;

at least one heater element in thermal contact with said nozzle assembly and operable to maintain said resin in a molten state through said at least one inner melt channel; and said insulating element disposed between said removable mold gate insert and said nozzle tip such that said nozzle tip is maintained adjacent said mold gate and inhibiting thermal transfer therebetween.

2. The injection nozzle system of claim 1 wherein said nozzle tip is removably attached to said nozzle housing.

3. The injection nozzle system of claim 1 wherein said insulating element comprises a sleeve.

4. The injection nozzle system of claim 3 wherein said sleeve includes an exterior threaded surface and said mold gate insert includes an interior set of complementary threads to removably connect said mold gate insert to said sleeve.

5. The injection nozzle system of claim 4 wherein said sleeve further includes an interior set of threads and said nozzle assembly includes an exterior set of complementary threads to removably connect said sleeve to said nozzle assembly.

6. The injection nozzle system of claim 4 wherein said sleeve is press fit into engagement with said nozzle assembly.

7. An insulated modular injection nozzle system for use in conjunction with an injection molding machine, comprising:

a mold gate insert having a mold gate therein;

a nozzle assembly comprising a thermally-conductive nozzle housing and a thermally-conductive nozzle tip, said nozzle assembly defining at least one inner melt channel to receive molten resin and to direct said molten resin to said mold gate;

at least one heater element in thermal contact with said nozzle assembly and operating to maintain said resin in a molten state through said at least one inner melt channel; and an insulating sleeve connecting said mold gate insert to said nozzle housing such that said nozzle tip is maintained adjacent said mold gate and inhibiting thermal transfer therebetween, wherein said insulating element further comprises a gap defined between said sleeve and said nozzle assembly.

8. The injection nozzle system of claim 7 wherein said gap has a vacuum formed therein.

9. The injection nozzle system of claim 8 wherein at least one interior surface of said gap includes a layer of material reflective to thermal radiation.

10. The injection nozzle system of claim 4 wherein said insulating element further comprises a layer of insulating material formed on said nozzle assembly.

11. The injection nozzle system of claim 1 wherein said insulating element comprises a layer of insulating material formed on said nozzle assembly.

12. The injection nozzle system of claim 1 wherein said insulating element is fabricated from titanium.

13. The injection nozzle system of claim 12 wherein said insulating element is also fabricated from zirconia oxide.

14. The injection nozzle system of claim 11 wherein said layer comprises zirconia oxide.

15. The injection nozzle system of claim 1 wherein said mold gate insert is fabricated from a material different from that of said mold plate.

16. The injection nozzle system of claim 15 wherein said material from which said mold gate insert is fabricated is selected to provide enhanced wear resistance relative to the material from which said mold plate is fabricated.

17. The injection nozzle system of claim 1 wherein said mold gate is formed by a gate ring removably mounted to said mold gate insert.

18. The injection nozzle system of claim 17 wherein said gate ring is fabricated from a different material than said mold gate insert.

19. The injection nozzle system of claim 18 wherein said mold gate insert is fabricated from a different material than said mold plate.

20. The injection nozzle system of claim 1 wherein said mold gate insert is removable from the mold area side of said mold plate.

21. The injection system of claim 1 wherein said insulating element further assists in inhibiting ingress of molten resin into unwanted areas with said system.

22. The injection system of claim 2 wherein said mold gate insert is removable from the mold area side of a mold plate.

23. The injection nozzle system of claim 22 wherein said nozzle tip is removable from said mold area side of said mold plate after said mold gate insert has been removed therefrom.

24. The injection nozzle system of claim 1 wherein said mold gate insert includes an abutment portion to engage a mold plate, said abutment portion being located adjacent said mold gate being sized to mitigate heat transfer between said mold gate and said mold plate.

25. The injection nozzle system of claim 23 wherein said mold gate insert includes an abutment portion to engage a mold plate, said abutment portion being located adjacent said mold gate being sized to mitigate heat transfer between said mold gate and said mold plate.

26. The injection nozzle system of claim 5 wherein said mold gate insert includes an abutment portion to engage a mold plate, said abutment portion being located adjacent said mold gate being sized to mitigate heat transfer between said mold gate and said mold plate.

27. A system according to claim 1, wherein said mold gate insert is removable from said mold plate while said mold gate insert is coupled to said nozzle assembly.

28. A system according to claim 1, wherein said mold gate insert has an angular abutment which is in contact with said mold plate.

29. A system according to claim 1, wherein said mold gate insert is configured so as to provide an air gap between said mold gate insert and said mold plate.

30. A system according to claim 1, wherein said insulating element comprises a sleeve which is removably engaged with both said mold gate insert and said nozzle assembly.

31. A system according to claim 1, wherein said nozzle tip has an annular melt channel.

32. A system according to claim 1, wherein said mold gate insert, said insulating element, and said nozzle assembly are removable, as a unit, from said mold plate in a direction away from the said mold cavity.

33. Injection molding apparatus for use with a mold cavity and a mold plate, comprising:

a nozzle assembly, coupled to the mold plate, for injecting a molten fluid into the mold cavity;

a mold gate insert removably coupled to a thermal insulating sleeve and having an abutment portion in contact with the mold plate, said mold gate insert defining an air gap between said mold gate insert and the mold plate, said mold gate insert having an outside diameter which is smaller than an inside diameter of a throat of the mold plate so that said mold gate insert may be removed through the mold plate throat in the direction of the mold cavity; and a thermal insulating sleeve disposed between said mold gate insert and said nozzle assembly, said insulating sleeve being removably coupled to both said mold gate insert and said nozzle assembly.

34. Apparatus according to claim 33, wherein said insulating sleeve and said nozzle assembly both have an outer dimension which is smaller than the throat of the mold plate so that said insulating sleeve and said nozzle assembly may be removed through the mold plate throat in the direction of the mold cavity.

35. Apparatus according to claim 33, wherein said insulating sleeve has external threads and internal threads engageable with corresponding threads on said mold gate insert and said nozzle assembly.

36. Apparatus according to claim 33, wherein said mold gate insert is removable through the mold plate throat before said insulating sleeve, said insulating sleeve being removable through the mold plate throat before said nozzle assembly, said nozzle assembly being removable through the mold plate throat.

37. Apparatus according to claim 33, wherein said mold gate insert includes tool-engaging structure for engaging a tool to said mold gate insert through the mold plate throat.

38. Apparatus according to claim 33, wherein the only contact between said mold gate insert and the mold plate is at the abutment of said mold gate insert.

39. Removable mold gate apparatus for an injection molding machine having a mold cavity, a mold plate, and a nozzle, said apparatus comprising:

a thermal insulator coupleable to the nozzle; and a mold gate insert coupleable to at least one of the thermal insulator and the nozzle, said mold gate insert having a first engaging structure on one surface thereof for engaging a complimentary structure on the mold plate, and a second engaging structure on a second surface thereof for engaging a complimentary structure on the nozzle, at least one of said first and second engaging structures having a portion which is non-parallel to an axial direction of the mold gate insert, both said first and second engaging structures being disposed to cause said mold gate insert to be removable from said mold gate in the axial direction of the mold gate insert.

* * * * *